United States Patent [19]

Kanamaru

[11] Patent Number: 4,516,160

[45] Date of Patent: May 7, 1985

[54] INFORMATION RECORDING AND REPRODUCING SYSTEM

[75] Inventor: Hitoshi Kanamaru, Tokorozawa, Japan

[73] Assignee: Universal Pioneer Corporation, Tokyo, Japan

[21] Appl. No.: 420,255

[22] PCT Filed: Jan. 19, 1982

[86] PCT No.: PCT/JP82/00019

§ 371 Date: Sep. 15, 1982

§ 102(e) Date: Sep. 15, 1982

[30] Foreign Application Priority Data

Jan. 19, 1981 [JP] Japan .................................. 56-6907

[51] Int. Cl.³ ............................................. H04N 9/493
[52] U.S. Cl. ..................................................... 358/326
[58] Field of Search ................. 358/326, 148, 150, 19, 358/17, 319

[56] References Cited

U.S. PATENT DOCUMENTS

| 4,090,215 | 5/1978 | Buchan | 358/326 |
| 4,292,648 | 9/1981 | Kowal | 358/326 |
| 4,357,628 | 11/1982 | Wharton | 358/326 |
| 4,422,103 | 12/1983 | Kanamaru | 358/326 |
| 4,422,104 | 12/1983 | Fujishima | 358/326 |

FOREIGN PATENT DOCUMENTS 48-11928 2/1973 Japan .

Primary Examiner—Michael A. Masinick
Attorney, Agent, or Firm—Fleit, Jacobson, Cohn & Price

[57] ABSTRACT

In a color video information reproduction system such as video disc player and video tape recorder, the color burst signal is inserted into each horizontal period even during the vertical blanking period of a video information signal when the video information signal is recorded in order to obtain correct time axis variation information of a reproduced signal. Upon reproduction of the recorded video information signal, the color burst signal is separated from the reproduced signal and phase difference between the separated color burst signal and a reference signal is detected. The time axis servo system is driven on the basis of the detected phase difference and a stable and improved reproduced picture can be obtained while preventing an adverse influence to the audio information.

8 Claims, 6 Drawing Figures

Fig. 6
(A)
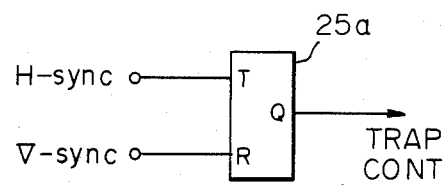
(B)
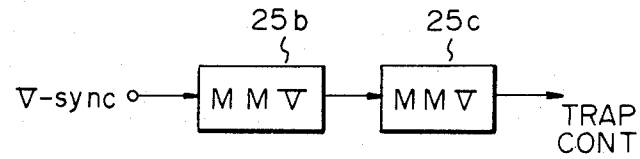

INFORMATION RECORDING AND REPRODUCING SYSTEM

TECHNICAL ART

The present invention relates to a color video information recording and reproducing system and, in particular, a color video information recording and reproducing system which is adapted to obtain improved color video pictures such that the video is stabilized, i.e., without variation of the time base or axis, during the reproduction of recorded video information by use of video disc player or video tape recorder.

BACKGROUND OF THE INVENTION

In the reproduction of the color video information by, for example, a video disc player, it is usual to suppress the variation in the time axis of the reproduced color video signal below a level of 10 $\mu$s. However, it is impossible to avoid eccentricity of the video disc mounted on the turn-table, therefore a color video signal detected during one rotation of the video disc contains a large time axis variation such as about 20 $\mu$s.

Accordingly, a time axis variation eliminating device is provided in a video disc player. In, for example, an optical video disc player, a tangential servo mechanism is provided as the time axis variation eliminating device, which mechanism includes a tangential mirror for deviating the reading beam in the tangential direction of a target track on the video disc. In such a tangential servo mechanism, the color burst signal contained in a color video signal is utilized as phase information of the reproducing signal. In other words, the timing or position on the time axis of the color burst pulse succeeding the reproduced horizontal sync pulse is utilized as the phase information. Comparison of the appearance of timings on the time axis is made between the leading or trailing edge of the color burst pulse, appearing about 7 $\mu$s after the leading edge of a reproduced H sync pulse, and a reference signal having the same repetition period as one horizontal period so as to detect a time axis error signal of the reproduced color video signal. The time axis error signal is used as the servo signal for the tangential servo system so as to eliminate the time axis variation or deviation in the reproduced signal.

In such a time axis deviation eliminating device as mentioned above, it is a problem that the time axis deviation eliminating device is apt to apply an incorrect time axis deviations to the reproduced signal since the color burst signal is absent during the vertical blanking period of about 9H periods (about 570 $\mu$s) of the reproduced color video signal. The particular time axis deviations are pulsating deviations of 60 Hz and do not affect the video signal due to deviations during the vertical blanking period. However, it is a problem that the time axis deviation causes periodic noises in an audio signal.

There is another player wherein a specific time axis deviation eliminating device is provided so as to avoid erroneous operation during the vertical blanking periods. However, the specific time axis deviation eliminating device is usually costly and furthermore cannot completely avoid the erroneous operation.

An object of the present invention is to provide a color video information recording system of simple construction which system can avoid adverse influence on an audio signal by completely eliminating possible time axis deviations in the reproduced color video signal.

Another object of the present invention is to provide a color video information reproducing system in which any adverse influence is avoided by eliminating time axis deviations during the vertical blanking periods.

DISCLOSURE OF THE INVENTION

A color video information recording system according to the present invention is characterized in that the color burst signal is inserted into a predetermined sectional period in each of the horizontal periods upon recording of the color video information even during the vertical blanking periods.

Furthermore, a color video information reproducing system according to the present invention is adapted to perform time axis correction on the basis of phase difference between a reference signal and the color burst signal upon reproduction of a color burst signal recorded in such a manner so as to contain the color burst signal in a predetermined sectional period in each horizontal period even during the vertical blanking period.

A color video information reproducing system according to the present invention is further adapted to supply the reproduced color video signal to the succeeding stage while eliminating the color burst signal appearing during the vertical blanking periods of the reproduced signal.

BRIEF DESCRIPTION OF DRAWINGS

FIG. 3 is a diagram showing a waveform of a signal to be recorded in accordance with the present invention;

FIGS. 6A and B are diagrams showing a concrete example of a part of the apparatus of FIG. 5.

BEST MODE FOR PRACTICING THE INVENTION

Hereinafter, an explanation of the invention is made with reference to the drawings to make understandable the features and the effects of the present invention.

Figure 1:
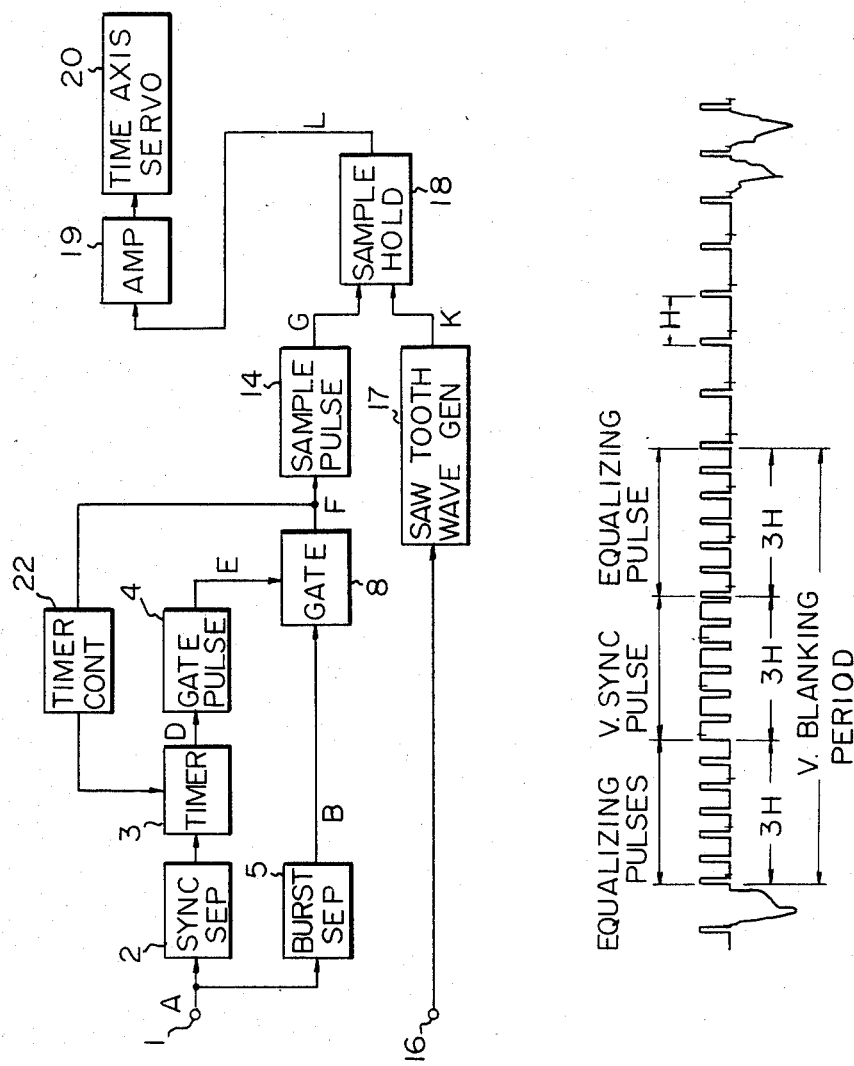
FIG. 1 is a block diagram showing a prior time axis correction circuit in a reproducing apparatus.
Figure 2:
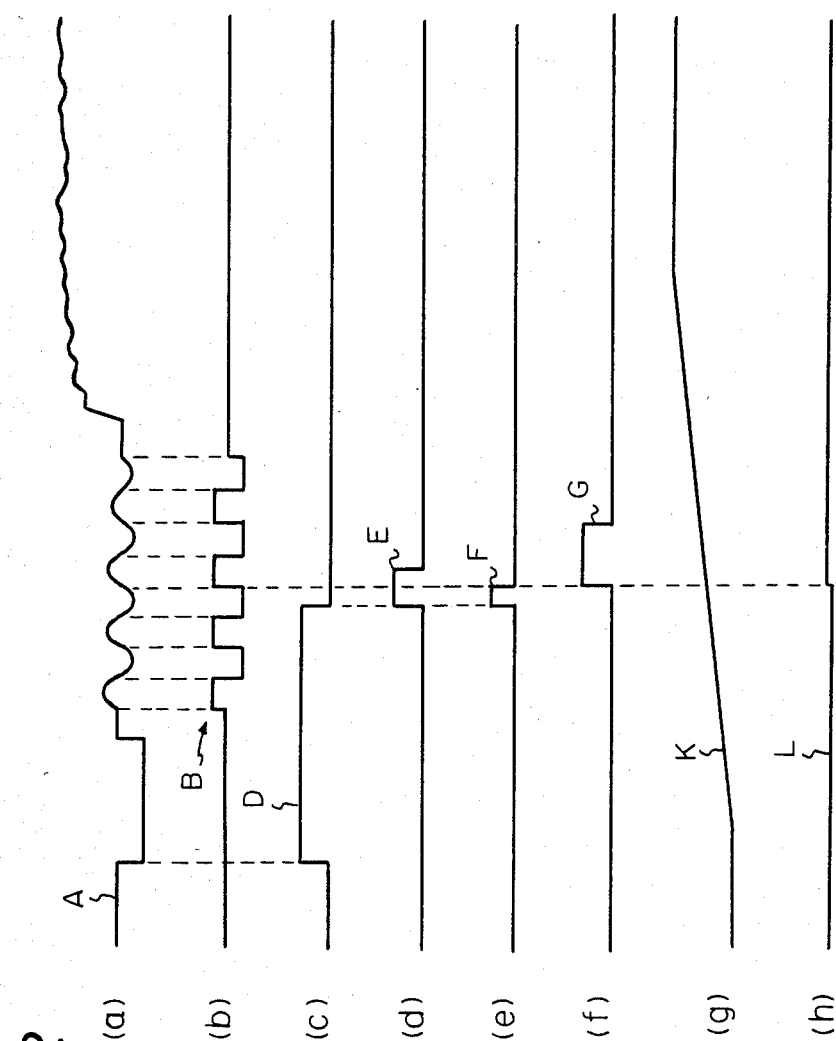
FIG. 2 is a diagram showing waveforms of signals appearing in the respective elements.

FIG. 1 is a rough block diagram showing such a prior time axis deviation eliminating device as mentioned above wherein signals appears having waveforms shown in FIG. 2. In this prior device, terminal 1 is supplied with a color video signal A [FIG. 2(a)] obtained from detecting means for detecting the color video signal from a video disc. A sync separator 2 is adapted to separate the horizontal sync pulse from the color video signal A, a timer circuit 3 is adapted to produce a delayed pulse D [FIG. 2(c)] rising up at the leading edge of the horizontal sync pulse and having a pulse width of about 7 $\mu$s varying in accordance with a delay control voltage. A gate pulse generator 4 is adapted to produce a gate pulse E [FIG. 2(d)] of about 3 $\mu$s rising up at the trailing edge of the delayed pulse D. On the other hand, a burst separator 5 is adapted to separate the color burst signal from the color video signal A and to produce a color burst signal B [FIG.

2(b)]. A time axis information pulse generating gate 8 is adapted to produce a time axis information pulse F in response to the burst pulse B and the gate pulse E, the time axis information pulse F rising up at the leading edge of the gate pulse E and falling down at the leading edge of the burst pulse within the pulse width of the gate pulse E. Accordingly, the pulse width of the pulse F varies in accordance with relative phase relation between the gate pulse E and the burst pulse B. A delay control circuit 22 supplies timer circuit 3 with the delay control voltage varying in accordance with the variations in pulse width of the pulse F and the pulse width of the delayed pulse D such that the leading edge of a particular burst pulse resides within the gate pulse E. A sampling pulse generator 14 produces a sampling pulse G [FIG. 2(f)] rising up at the trailing edge of the pulse F.

To the terminal 16 is applied a stable reference horizontal sync pulse generated in a video disc player and a saw-tooth wave generator 17 produces a saw-tooth wave signal K [FIG. 2(g)] in synchronism with the reference horizontal sync pulse. A sample-hold circuit 18 produces an error signal L [FIG. 2(h)] representative of variations of the time axis by sample-holding the saw-tooth wave signal K on the basis of the sampling pulse G. The error signal L is applied through a servo amplifier 19 to a servo mechanism 20 which controls a detector, such as a tangential mirror in the case of optical system, and makes the leading edge of the particular burst pulse within the color video signal to appear at a relative constant position with respect to the reference horizontal sync pulse so as to make the time axes of the color burst and the reference horizontal sync pulse coincide with each other thereby to eliminate the variations in the time axis of the reproduced color video signal.

In such a construction as mentioned above, the color burst signal is absent during the vertical blanking periods of about 9H (about 570 μs) of the color video signal and, during the vertical blanking periods the pulse F, the output of the gate 8, has a pulse width equal to that of the gate pulse E or varies at random due to noises. As a result, the delay control circuit 22 supplies the timer circuit 3 with an erroneous delay control voltage and the timer circuit 3 produces the delayed pulse of an erroneous pulse width. Accordingly, the sample-hold circuit 18 produces an erroneous error signal L, whereby the time axis variation eliminating device causes an unwanted time axis variation. This unwanted time axis variation is pulsating variations of 60 Hz which does not cause any problem for the video signal but causes periodic noises to the audio signal, which results in a great problem.

FIG. 3 shows a signal wave of a composite video signal to be recorded according to a recording system of the subject invention. The illustrated wave is the wave around the vertical blanking period. As illustrated, the composite video signal contains the color burst signal at the predetermined sectional period of each horizontal period even within the vertical blanking period. Although the illustrated waveform represents an even field, it is apparent that an odd field has a similar waveform as the even field.

Figure 4:
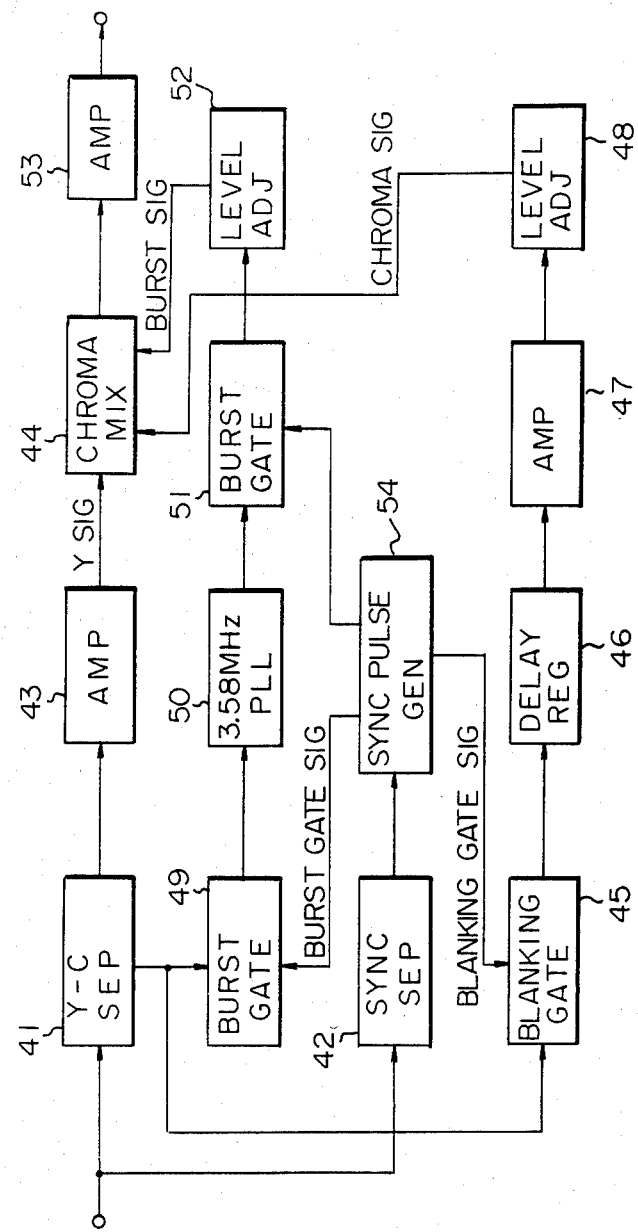
FIG. 4 is a block diagram showing a recording apparatus for producing such recording signal as shown in FIG. 3.

FIG. 4 is a block diagram of a circuit for obtaining the composite video signal wave shown in FIG. 3. A composite video signal (NTSC signal) to be recorded is supplied to a Y-C (luminous signal-chroma signal) separator 41 and a sync separator 42, respectively. The Y-C separator 41 extracts a luminous signal component which is applied through an amplifier 43 to a chroma mixer 44. On the other hand, a subcarrier component introduced by the Y-C separator 41 is eliminated from the blanking periods and applied to the succeeding delay regulating circuit 46 which applied, via an amplifier 47 and a level regulating circuit 48, to the chroma mixer 44 as a chroma component to regulate the time axis with respect to the luminous signal.

The burst signal is gated by a burst gate 49 and then applied to a PLL (Phase Locked Loop) 50 of 3.58 MHz which produces a signal of 3.58 MHz. This 3.58 MHz signal is gated by a burst 51 during the burst insertion period and applied via a level adjust circuit 52 to the chroma mixer 44 which mixes the 3.58 MHz signal with the previous luminous signal and chroma signal. The mixed signals are supplied via an amplifier 53 to the succeeding stage as a recording signal having such a waveform as shown in FIG. 3. The respective gate signals supplied to the burst gates 49 and 51 and blanking gate 45 are obtained by a sync pulse generator 54 on the basis of the output of the sync pulse separator 42.

In a prior system, a gate circuit is provided between the burst gate 51 and the level adjust circuit 52 which gate circuit prohibit the burst signal to be applied to the succeeding stage only during the blanking period thereby to eliminate the burst signal during the blanking periods. In this case, the prohibition gate circuit is omitted and the color burst signal is added to the predetermined period even during the vertical blanking period thereby to produce such a composite video signal as shown in FIG. 3. The output signal of the amplifer 53 is recorded on a recording medium in a certain modulation system.

Figure 5:
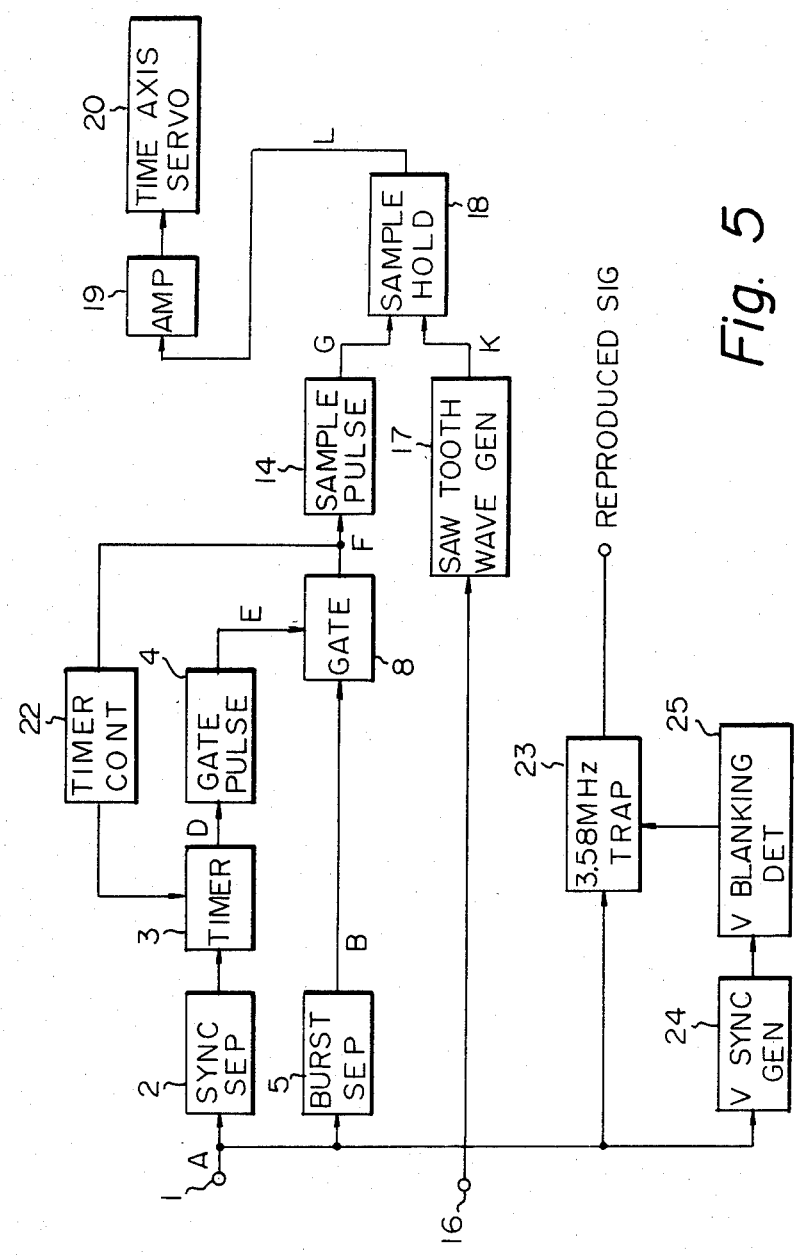
FIG. 5 is a block diagram showing a reproducing apparatus according to the present invention.

FIG. 5 is a block diagram showing a time axis correction device according to the present invention, wherein the corresponding elements to those shown in FIG. 1 are designated by the same reference numerals as in FIG. 1. In addition to the construction shown in FIG. 1, a trap circuit 23 is provided for eliminating the color burst signal of 3.58 MHz. In order to perform ON-OFF control for the trap circuit, a vertical sync pulse generator 24 for detecting the vertical sync pulse from the reproduced signal is provided and a blanking detecting circuit 25 is provided for detecting the vertical blanking period on the basis of the sync pulse. The trap circuit 23 is operated during the existence of the output of the blanking detecting circuit, so that the color burst signal during the vertical blanking period is eliminated, and then the reproduced signal is applied to the succeeding stage such as a detector.

With the above-mentioned arrangement, such time axis correction operation as mentioned with reference to FIGS. 1 and 2 can be performed even during the vertical blanking period in response to the appearance of the color burst signal, so that reproduction of the video and/or audio signals can be stably performed without a lapse of information regarding correction of the time axis.

FIGS. 6(A), (B) illustrate examples of the blanking detecting circuit 25 in FIG. 5. In FIG. 6(A), the circuit includes a counter 25a which is adapted to be reset by the vertical sync pulse from the vertical sync pulse generator 24 and to count the horizontal sync pulse. In FIG. 6(B), the circuit includes a monostable multivibrator 25c being triggered by the vertical sync pulse, and another monostable multivibrator 25c being triggered by the trailing edge of the output signal from the multivibrator 25b, the output signal of the multivibrator 25c being used as a trap signal. Other examples can be conceived other than the above examples. Furthermore, digital information signal recorded in a video format is regarded as the color video signal in the subject invention.

CAPABILITY OF EXPLOITATION IN INDUSTRY

As mentioned above, the subject invention can provide stable time axis correction with simpler construction and accordingly a less expensive recording and reproduction system. Furthermore, the added color burst signal is eliminated from the signal to be reproduced in a reproduction system so that no adverse influence is caused on a color video displayer such as monitor TV and a usual TV set. Accordingly, the subject invention can be preferably applied to a color video information recording and reproducing system such as a video disc player and a video tape recorder.

I claim:

1. In a color video composite signal recording system, the improvement comprising:
   first means for receiving a color video composite signal including luminance, chrominance, and synchronous components; and
   second means for adding an additional color burst signal at a predetermined sectional period of each horizontal period within each vertical blanking period of said color video composite signal, said additional color burst signal having the same frequency and phase as a color burst signal contained in the color video composite signal other than the vertical blanking period.

2. A color video composite signal recording system according to claim 1 in which said second means includes burst separating means for separating an original color burst signal from said color video composite signal, burst signal generating means for producing a synthetic burst signal in synchronism with said original color burst signal separated by said burst separating means, said synthetic burst signal being used both as said additional color burst signal during each vertical blanking period and as the color burst signal during period other than the vertical blanking period, and inserting means for inserting said synthetic burst signal at a predetermined sectional period of each horizontal period in said color video composite signal.

3. A color video composite signal recording system according to claim 1 in which said second means includes a Y-C separator for separating luminance and chrominance components from said color video composite signal, burst separating means for separating the original color burst signal from said chrominance signal, common burst signal generating means for producing a common color burst signal in synchronism with said original color burst signal separated from said chrominance component, and mixer means for mixing said common color burst signal and said chrominance component with said luminance component, said common color burst signal appearing at a predetermined time position within every horizontal period even within the vertical blanking period and constituting said additional burst signal within the vertical blanking period.

4. A color video composite signal recording system according to claim 2 which further includes delay means for applying a delay to said chrominance component corresponding to a time period for the production of said additional color burst signal on the basis of said original color burst signal.

5. A color video composite signal recording system according to claim 2 in which said predetermined sectional period of each horizontal period is contiguous with the period of occurrence of the horizontal synchronizing signal.

6. A color video composite signal recording system according to claim 3 in which said predetermined sectional period of each horizontal period is contiguous with the period of occurrence of the horizontal synchronizing signal.

7. A color video information recording and reproducing method which comprises:
   receiving a color video composite signal including luminance, chrominance, and synchronous components;
   separating said chrominance component from said color video composite signal;
   producing a common color burst signal in synchronism with an original color burst signal contained in said chrominance component and inserting said common color burst signal into a predetermined sectional period of each horizontal period within each vertical blanking period, said common color burst signal appearing at a predetermined time position within every horizontal period within the vertical blanking period and constituting an additional burst signal within the vertical blanking period;
   recording the resultant color video composite signal containing said additional color burst signal on a recording medium;
   reading the recorded color video composite signal from said recording medium while performing time-axis servo control in accordance with the basic and additional color burst signal separated from the recorded color video composite signal; and
   eliminating said additional color burst signal from said color video composite signal obtained from said recording medium thereby to reproduce the color video composite signal.

8. In a color video composite signal recording system, the improvement comprising:
   first means for receiving a color video composite signal including luminance, chrominance, and synchronous components; and
   second means for sensing a predetermined point in each horizontal sync pulse and adding an additional color burst signal at a predetermined sectional period in each horizontal period after said predetermined point within each vertical blanking period of said color video composite signal, said additional color burst signal having the same frequency and phase as a color burst signal contained in the color video composite signal other than the vertical blanking period.

* * * * *